United States Patent
Chen

(10) Patent No.: US 11,243,933 B2
(45) Date of Patent: Feb. 8, 2022

(54) TIME SENSITIVE DATA STORE

(71) Applicant: Opendoor Labs Inc., San Francisco, CA (US)

(72) Inventor: Michael Chen, San Francisco, CA (US)

(73) Assignee: Opendoor Labs Inc., San Francisco, CA (US)

(*) Notice: Subject to any disclaimer, the term of this patent is extended or adjusted under 35 U.S.C. 154(b) by 329 days.

(21) Appl. No.: 16/456,429

(22) Filed: Jun. 28, 2019

(65) Prior Publication Data

US 2020/0004733 A1  Jan. 2, 2020

Related U.S. Application Data

(60) Provisional application No. 62/692,242, filed on Jun. 29, 2018.

(51) Int. Cl.
*G06F 7/00* (2006.01)
*G06F 16/22* (2019.01)
*G06F 16/2455* (2019.01)
*G06Q 50/16* (2012.01)
*G06N 20/00* (2019.01)

(52) U.S. Cl.
CPC ........ *G06F 16/2282* (2019.01); *G06F 16/221* (2019.01); *G06F 16/2456* (2019.01); *G06N 20/00* (2019.01); *G06Q 50/163* (2013.01)

(58) Field of Classification Search
CPC .............. G06F 16/2282; G06F 16/221; G06F 16/2456; G06N 20/00; G06Q 50/163
USPC ................................................ 707/600–899
See application file for complete search history.

(56) References Cited

U.S. PATENT DOCUMENTS

2011/0184918 A1* 7/2011 Atluri ................ G06F 16/2358
707/683

* cited by examiner

*Primary Examiner* — Isaac M Woo
(74) *Attorney, Agent, or Firm* — Schwegman Lundberg & Woessner, P.A.

(57) ABSTRACT

In an example embodiment, a solution is provided that produces wide tables containing features for machine learned models. These wide tables are made available for model training for multiple models and/or groups. These wide tables may be served on a serving database for fast access for application program interface (API) serving and lightweight access during interactive development. The solution decreases the time needed to add a new feature from several days to a couple of hours by enabling experimentation.

20 Claims, 7 Drawing Sheets

| ADDRESS_TOKEN1 | BEDROOMS1 BATHROOM1 SQUARE_FT1 |
| ADDRESS_TOKEN 2 | BEDROOMS2 BATHROOM2 SQUARE_FT2 |

*FIG. 2*

TIME SENSITIVE DATA STORE

CROSS-REFERENCE TO RELATED APPLICATION

This application claims the benefit of priority of Michael Chen., U.S. Provisional Patent Application No. 62/692,242, entitled "TIME SENSITIVE DATA STORE AND COMPARABLES DATA STORE," filed on Jun. 29, 2018, the entirety of which is hereby incorporated by reference herein.

BACKGROUND

Machine learning involves the use of one or more machine learning algorithms to train a model that can be used to perform certain calculations. Commonly, many machine learned models are used to output various predictions. The training of each model involves using training data to help the machine learning algorithm(s) learn coefficients/weights to be applied to various features in the input data. While such machine learned models are trained for use in a number of different industries, they can have problems when dealing with time sensitive data.

One example of time sensitive data is data regarding housing prices. It may be desirable to create a machine learned model to output a predicted market value for a house, but housing prices can change dramatically in a short amount of time. In order to make sure such models are accurate, they must essentially be retrained very frequently. This has traditionally involved administrators wishing to implement a machine learned model to creating a pipeline to preprocess data into usable features (typically keyed by address and timestamp). This, however, can cause several technical issues. First of all, existing systems are inefficient. A significant amount of work on maintaining these pipelines is duplicated. Two separate groups within a company may use slightly different models that utilize the same features, and yet the pipelines for these two separate groups may be kept separate. Second of all, existing systems do not share information easily with those that could use it. It is difficult to discover and share features used by different groups/models. There can also be duplicated work on serving pipelines for model features. Each group needs to define and own a serving layer for features.

Furthermore, existing systems are inaccurate. Training machine learned models to make predictions based on housing data can introduce bias if the training data is not properly screened to avoid introduction of data points outside of a particular time period used for the model. For example, one may train a model using housing data from 2012 to 2017, which would allow the accuracy of the model to be judged against actual housing transactions from 2018 or later, but doing so requires that the model be limited in its training data to data from 2012 to 2017. This can be difficult to accomplish due to the nature of how housing data is typically gathered and stored.

BRIEF DESCRIPTION OF THE DRAWINGS

To easily identify the discussion of any particular element or act, the most significant digit or digits in a reference number refer to the figure number in which that element is first introduced.

FIG. 2 is a diagram illustrating an example of a table, in accordance with an example embodiment.

DETAILED DESCRIPTION

Glossary

Figure 1:
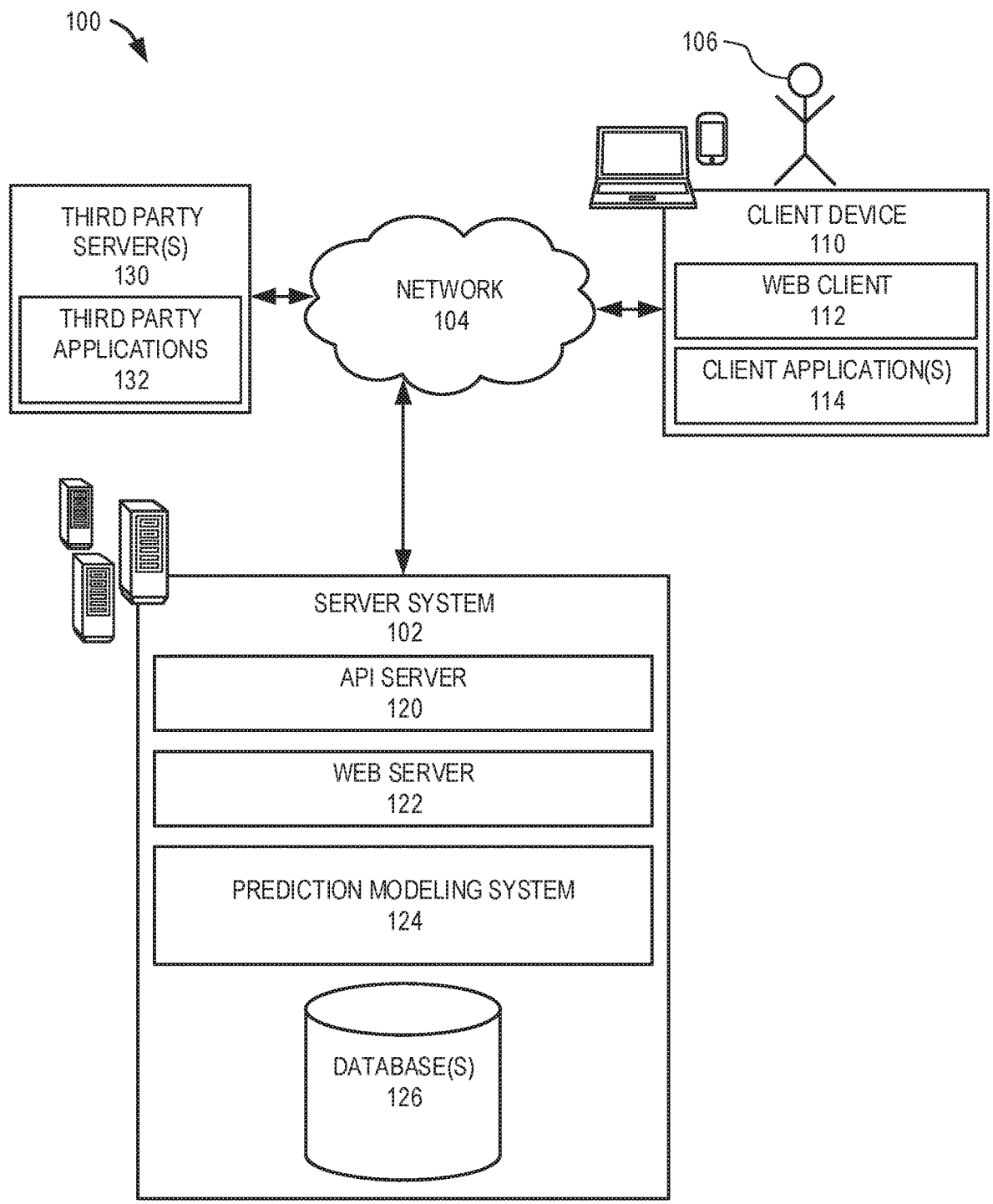
FIG. 1 illustrates a system, in accordance with one embodiment.

"Computer-Readable Medium" in this context refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Communication Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Machine-Storage Medium" in this context refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Rsync" in this context refers to a utility for efficiently transferring and synchronizing files across computer systems by checking the timestamp and size of files. It is commonly found on Unix-like systems and functions as both a file synchronization and file transfer program. The rsync algorithm is a type of delta encoding and is used for minimizing network usage. Rsync is typically used for synchronizing files and directories between two different systems. For example, if the command rsync local-file user@remote-host:remote-file is run, rsync will use SSH to connect as user to remote-host. Once connected, it will invoke the remote host's rsync and then the two programs will determine what parts of the file need to be transferred over the connection. Rsync can also operate in a daemon mode, serving and receiving files in the native rsync protocol (using the "rsync://" syntax).

"Processor" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), or any combination thereof. A processor may further be a multi-core processor having two or more independent processors (sometimes referred to as "cores") that may execute instructions contemporaneously.

"Component" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a FPGA or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Signal Medium" in this context refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Carrier Signal" in this context refers to any intangible medium that is capable of storing, encoding, or carrying instructions for execution by the machine, and includes digital or analog communication signals or other intangible media to facilitate communication of such instructions. Instructions may be transmitted or received over a network using a transmission medium via a network interface device.

Description

In an example embodiment, a solution is provided that produces wide tables containing features for machine learned models that allow for more efficient processing, improved sharing of information, and increased accuracy. These wide tables are made available for model training for multiple models and/or groups. These wide tables may be served on a serving database for fast access for API serving and lightweight access during interactive development. The solution decreases the time needed to add a new feature from several days to a couple of hours by enabling experimentation.

For purposes of this document, a table may be defined as a collection of rows held on a structured format with the same schema. It can take multiple physical representations, including, for example, a Postgres table, Parquet file, CSV file, or Big Query Table, and usually contains a key that uniquely identifies each row.

For purposes of this document, features are joins between different tables on the same key (e.g., address, timestamp) with perhaps simple transformations applied to some fields that will make it more suitable for machine learning training and/or service, such as the nullification of values that are obviously incorrect.

These two concepts allow for the separation of physical mechanisms for managing tables from the logical design of features, while allowing each layer to be iterated on separately. For example, supporting a new table format merely requires the user to implement a common interface, which could immediately be used by a feature layer without any knowledge of the physical details.

FIG. 1 is a block diagram illustrating a networked system 100, according to some example embodiments, configured to simulate projections for negotiation loss, price drop slope, and markup. The system may simulate projections for other aspects of home buying and selling in other example embodiments. In one example, the system 100 is a networked system for buying and selling homes online. In one example, projection simulations described herein are used to determine a value to offer to a homeowner to buy their home, a fee to charge a homeowner to buy their home, a price drop slope, a fair market valuation of the home, a list price for the home, and so forth.

The system 100 may include one or more client devices such as client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to access and utilize home buying services. For example, the client device 110 may be used to input information to request an offer on a home, make an offer on a home, receive and display various information about a home or a market, and so forth.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., third-party servers 130, server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a VPN, a LAN, a WLAN, a WAN, a WWAN, a MAN, a portion of the Internet, a portion of the PSTN, a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, an online home buying and selling application, a real estate application, and the like.

In some embodiments, one or more client applications 114 may be included in a given one of the client device 110 and configured to locally provide the user interface and at least some of the functionalities, with the client application 114 configured to communicate with other entities in the system 100 (e.g., third-party servers 130, server system 102, etc.), on an as needed basis, for data and/or processing capabilities not locally available (e.g., access location information, access market information related to homes, to authenticate a user 106, to verify a method of payment, etc.). Conversely, one or more applications 114 may not be included in the client device 110, and then the client device 110 may use its web browser to access the one or more applications hosted on other entities in the system 100 (e.g., third-party servers 130, server system 102, etc.).

A server system 102 may provide server-side functionality via the network 104 (e.g., the Internet or WAN) to one or more third-party servers 130 and/or one or more client devices 110. The server system 102 may include an API server 120, a web server 122, and a prediction modeling system 124, that may be communicatively coupled with one or more databases 126.

The one or more databases 126 may be storage devices that store data related to users of the system, applications associated with the system, cloud services, housing market data, and so forth. The one or more databases 126 may further store information related to third-party servers 130, third-party applications 132, client devices 110, client applications 114, users 106, and so forth. In one example, the one or more databases 126 may be cloud-based storage.

The server system 102 may be a cloud computing environment, according to some example embodiments. The server system 102, and any servers associated with the server system 102, may be associated with a cloud-based application, in one example embodiment.

The prediction modeling system 124 may provide back-end support for third-party applications 132 and client applications 114, which may include cloud-based applications. The prediction modeling system 124 may process requests for offers for one or more homes, offers for homes, request for housing market information, and so forth. The prediction modeling system 124 may comprise one or more servers or other computing devices or systems.

The system 100 may further include one or more third-party servers 130. The one or more third-party servers 130 may include one or more third-party application(s) 132. The one or more third-party application(s) 132, executing on third-party server(s) 130, may interact with the server system 102 via API server 120 via a programmatic interface provided by the API server 120. For example, one or more the third-party applications 132 may request and utilize information from the server system 102 via the API server 120 to support one or more features or functions on a website hosted by the third party or an application hosted by the third party. The third-party website or application 132, for example, may provide software version analysis functionality that is supported by relevant functionality and data in the server system 102.

A table is a collection of rows stored closely together in the same schema. FIG. 2 is an example of such a table. Each table that contains a field that will be used as a feature for any model is defined in a central tables text file, whose schema is defined in a schema language. This may be termed a feature store and may be implemented using the following pseudocode:

```
package feature_store;
message Table {
  // Unique identifier of this table.
  string name = 1;
  // Human-readable description about what data this table contains.
  string description = 2;
  // File-path where the SQL4lchemy schema definition for this table
  // is stored.
  string schema_path = 3;
  // Configuration that is relevant for a particular storage driver.
  // Whichever is set determines the physical storage medium where this table
  // lives.
  oneof storage_config {
    PostgresConfig postgres_config = 4;
    ParquetConfig parquet_config = 5;
    BigQueryConfig bigquery_config = 6;
  }
}
message PostgresConfig {
  // Name of the db session that this table belongs to. This is to
  // identify tables from different RDS instances (e.g. web or dwellings).
  string session_name = 1;
  // Name of the table as known by Postgres.
  string table_name = 2;
}
message ParquetConfig {
  // Path to where the Parquet file is stored. It can contain simple regular
  // expressions to signal regularly updated files. Only one path will be used.
  // E.g.: s3://my-bucket/production/%Y/%M/%d/my-dataset.parquet.snappy.
  string file_path = 1;
}
message
```

Each different storage mechanism may be associated with their specific configuration and implements an interface so that management of features can be agnostic of each different storage. The interface may be implemented using the following pseudocode:

```
def __init__(self, config: feature_store.Table) -> None:
    ...
def table_config(self) -> feature_store.Table:
    ...
def schema(self) -> sqlalchemy.Table:
    ...
@abc.abstractmethod
def materialize_parquet(self, path: str, session: pyspark.sql.SparkSession) -> None:
    """Materializes the table specfied in `table_config` as a parquet file.
    The output file should be written to `path`. The driver can use `session` to
    access a Spark cluster to parallelize this computation.
    """
    pass
```

It should be noted that the Parquet model was used in this example as the basis format to simplify interaction from the features part. Parquet was chosen as it is a good fit for model training and also has good support for parallelization, which than then be easily transformed to any serving store, such as Postgre, Cassandra, and Base.

Figure 3:
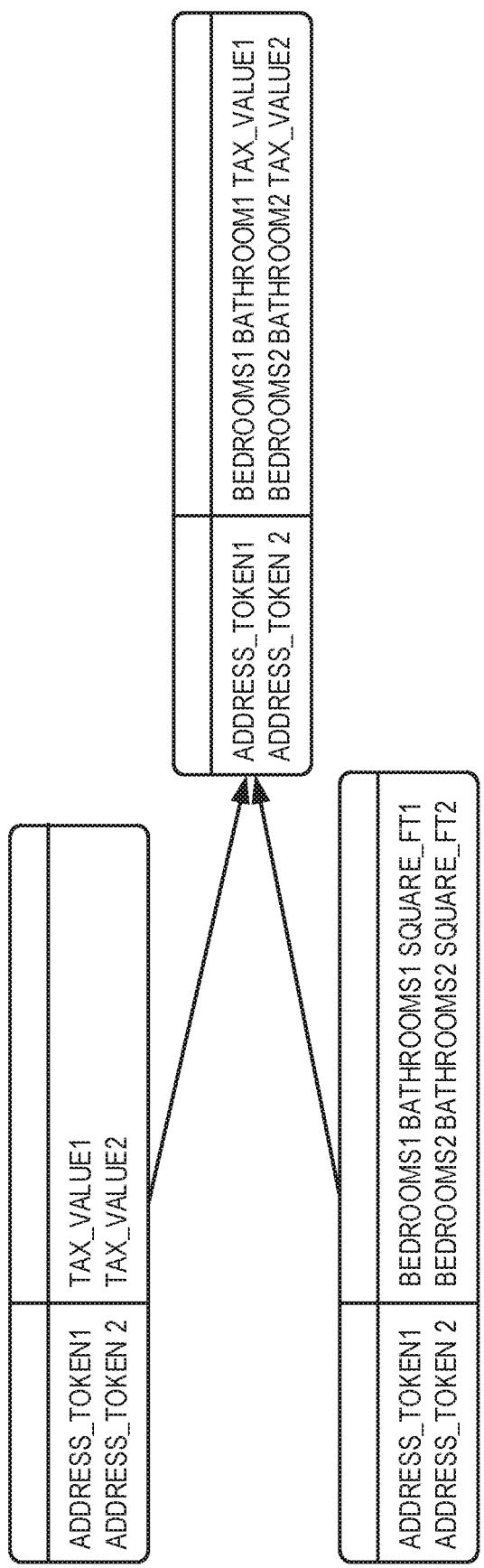
FIG. 3 is a diagram illustrating an example of features, in accordance with an example embodiment.

As described above, features are joins between tables FIG. 3 is a diagram illustrating an example of features, in accordance with an example embodiment. Features are what someone building a model would care about. They define a configuration file that references all the fields needed from each of the tables defined. This may be implemented using the following pseudocode:

```
package feature_store;
// A FeatureSet is a curated table that is the result of joining multiple
// tables and applying some logic to it.
message FeatureSet {
  // Unique name of this FeatureSet
  string name = 1;
  // Defines what are the input tables of this FeatureSet, i.e. which tables
  // should be used and how they should be joined.
  InputTable input_table = 2;
  // Primary key of this FeatureSet. This is used to specify the index that will
  // be used for fast-access on the serving path.
  repeated string keys = 3;
  // List of columns that should be the output of this FeatureSet. This
  // is what gets persisted and used by consumers.
  repeated FeatureColumn columns = 4;
}
// InputTable defines a potential join between different tables.
message InputTable {
  string table_name = 1;
  // Specifies how to join table_name with other tables. This is what
  // makes FeatureSets be wide tables.
  message JoinTable {
    // Name of the table to join against.
    string right_table_name = 1;
    // Columns from left and right table on where the join is going to
    // happen. Only equality is supported on joins.
    string left_on_column_name = 2;
    string right_on_column_name = 3;
    // Type of join that is going to be applied. Valid options are the
    // same options as in PySpark Dataframe join (e.g. inner, left, left_outer,
    // etc.).
    string how = 4;
  }
  repeated JoinTable join_table = 2;
}
message FeatureColumn {
  // Name of the column. Should be unique inside the FeatureSet.
  string name = 1;
  // A feature column could simply be a column from one the source tables,
  // or some logic applied to a row.
  oneof feature_column_source {
    // Unique path that identifies a field on a Table. Names are of the form
    // $TABLE_NAME.$FIELD_NAME where $FIELD_NAME is one field defined on the
    // schema of $TABLE_NAME and was imported through InputTable.
    string field_path = 2;
    // Absolute path (in python) to a function that takes a spark Dataframe
    // containing the whole InputTable and should return a pyspark.sql.Column
    // with the calculated feature. This useful for columns that need access
    // to multiple columns.
    string column_builder_function_path = 3;
  }
}
```

The FeatureSet definition is used to create another Parquet file containing the columns specified, which can then be used for model training and for serving.

Once a FeatureSet has materialized as a Parquet file, that table can be materialized. Regularly updating each FeatureSet and materializing it ensures that feature fetching only has to hit one table online instead of relying on multiple joins for online serving.

In one example embodiment, tables may be stored in a persistent metastore (backed by an RDS instance) so that indexes are kept around. The data may be kept on S3. PySpark may be the framework used to build each FeatureSet as it allows the scaling of computations.

When iterating over a FeatureSet for model training, two commands may be defined:

1. build_feature_set_input_table—feature-set $FEATURE_SET—path $PATH which, given a FeatureSet definition, will perform all the joins necessary for the input table and can later be iterated on.

2. build_feature_set—feature-set $FEATURE_SET—input-table $PATH will build the feature set using the input table from 1. This command would fail if the input table does not contain the necessary columns.

These two commands allow a user to iterate over feature set definitions without having to recalculate all joins every time.

Example Configuration Files

```
# tables.textproto
table {
  name: "dwellings.home_details"
  description: "Resolved home attributes by dwellings. It contains information "
               "about a home that should not change very often"
  schema_path: "noise/schemas/dwellings/home_details.py"
  postgres_config {
    session_name: "dwellings"
    table_name: "home_details"
  }
}
table {
  name: "dwellings.addresses"
  description: "..."
  schema_path: "noise/schemas/dwellings/addresses.py"
  postgres_config {
    session_name: "dwellings"
    table_name: "addresses"
  }
}
table {
  name: "bsi_parcels"
  description: "..."
  schema_path: "noise/schemas/bsi_parcels.py"
  parquet_config {
    file_path: "s3://my-bucket/production/%Y-%M-%d/bsi_parcels.parquet.snappy"
  }
}
# ovm_feature_set.textproto
feature_set {
  name: "ovm_featureset"
  input_table {
    table_name: "dwellings.addresses"
    join_table {
      right_table_name: "dwellings.home_details"
      left_on_colunm_name: "dwellings.addresses.address_token"
      right_on_colunm_name: "dwellings.home_details.address_token"
      how: "left"
    }
    join_table {
      right_table_name: "bsi_parcels"
      left_on_colunm_name: "dwellings.addresses.county"
      right_on_colunm_name: "bsi_parcels.county"
      how: "left"
    }
  }
  columns {
```

-continued

```
    name: "address_token"
    field_path: "dwellings.addresses.address_token"
  }
  columns {
    name: "bedrooms"
    field_path: "dwellings.home_details.bedrooms"
  }
  columns {
    name: "parcel_geometry"
    field_path: "bsi_parcels.geometry"
  }
  columns {
    name: "parcel_area"
    // This points to a spark function that will create this new
column by
    // potentially doing some geo computations.
    column_builder_function_path:
"noise.calculate_features.ovm.parcel_area"
  }
}
```

In an example embodiment, other feature stores may be used in conjunction with the wide table feature store in order to aid performance. For example, an House Pricing Index (HPI) feature store may add columns that help the performance of fetching from the feature store, such as adding a yearstr column to partition the table in the feature store to help joins be performed faster. Specifically, a distributed data store such as Apache Spark uses a concept of partitions to improve the speed of data access. Because home data is often queried temporally, that is, most queries are performed over a year or two of data, in an example embodiment, data can be partitioned by year so that the distributed query engine understands which data is more likely to be required for a given user query. In another example, a subdiv stats feature store may add columns such as feature_store_market for a partition and year_months to downsample the values, making joins faster because it results in smaller data better partitioned for joins. House parcels are typically grouped into subdivisions, and thus housing data can be obtained at the subdivision-level (e.g., average home price in the subdivision over time). Such subdivision-level data may be stored in a table named subdiv or subdiv stats.

A rolling stats table may provide non-leaky per-closed date stats such as clearance rate, trailing inventory days, mean close price, and so forth for various granularities (e.g., city, market, postal code, week, etc.).

Figure 4:
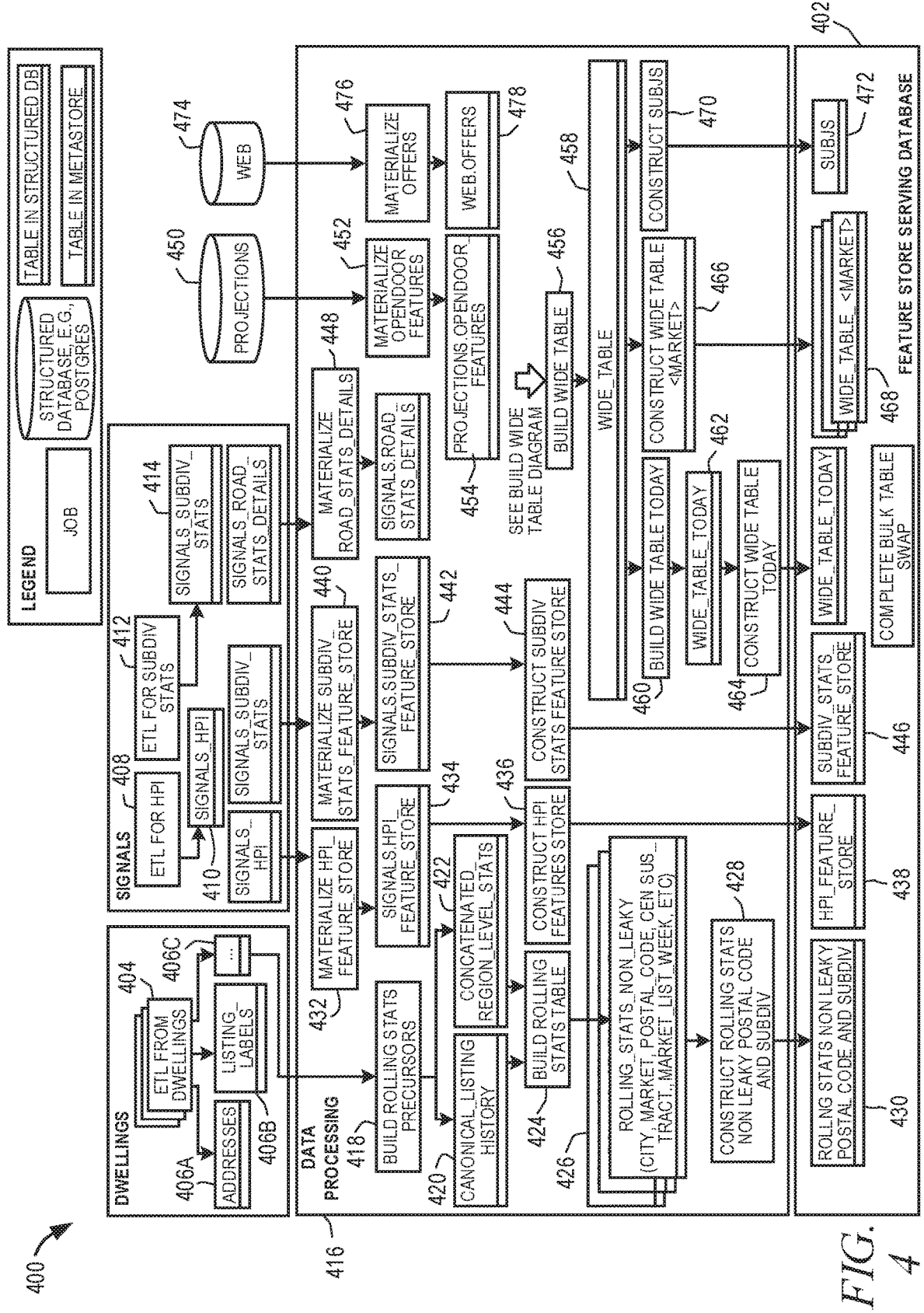
FIG. 4 is a diagram illustrating an architecture providing a feature store serving database, in accordance with an example embodiment.

FIG. 4 is a diagram illustrating an architecture 400 providing a feature store serving database 402, in accordance with an example embodiment. An extract, transform, and load (ETL) from dwellings component 404 acts to extract data such as address data 406A, listing labels 406B, and other data 406C from real estate listing information, such as from listing information collected by multiple listing service (MLS) companies. Likewise, an ETL for HPI component 408 acts to extract data about general housing statistics from third party database, such as a government database, providing signal data 410. An ETL for Subdiv Stats component 412 acts to extract data subdivision statistics as described above.

A data processing component 416 has various procedures for processing the data produced by the ETL components 404, 408, 412. This may include a build rolling stats precursors procedure 418, which builds various statistical precursors 420, 422 that can then be used by a build rolling stats table 424 to build a non-leaky rolling stats table 426. The non-leaky rolling status table 426 can then be used by a contrast rolling stats non-leaky postal code and subdivision procedure 428 to obtain a non-leaky rolling stats postal code and subdivision table 430.

A materialize HPI feature store procedure 432 may generate signals 434 used by a construct HPI feature store procedure 436 to construct an HPI feature store 438.

A materialize subdivision status feature store procedure 440 may generate signals 442 used by a construct subdivision stats feature store 444 to construct a subdivision stats feature store 446.

A materialize read stats details procedure 448 may generate road stat details signals.

Projections stored in a projections database 450 may then be used by a materialize projection features 452 procedure to generate projection features 454, which can then be used by a build wide table procedure 456 to build the wide table 458. Each day, a build wide table today procedure 460 may generate an intermediate table 462, which then may be used by a construct wide table today procedure 464 to construct the day's wide table. Additionally, a construct wide table <market> procedure or procedures 466 may construct multiple wide tables 468, with a different wide table for each market. Furthermore, a construct subjects 470 procedure may act to construct a subjects table 472 from the wide table 458.

Information in a web database 474 may then be used by a materialize offers procedure 476 to generate web offers 478.

Figure 5:
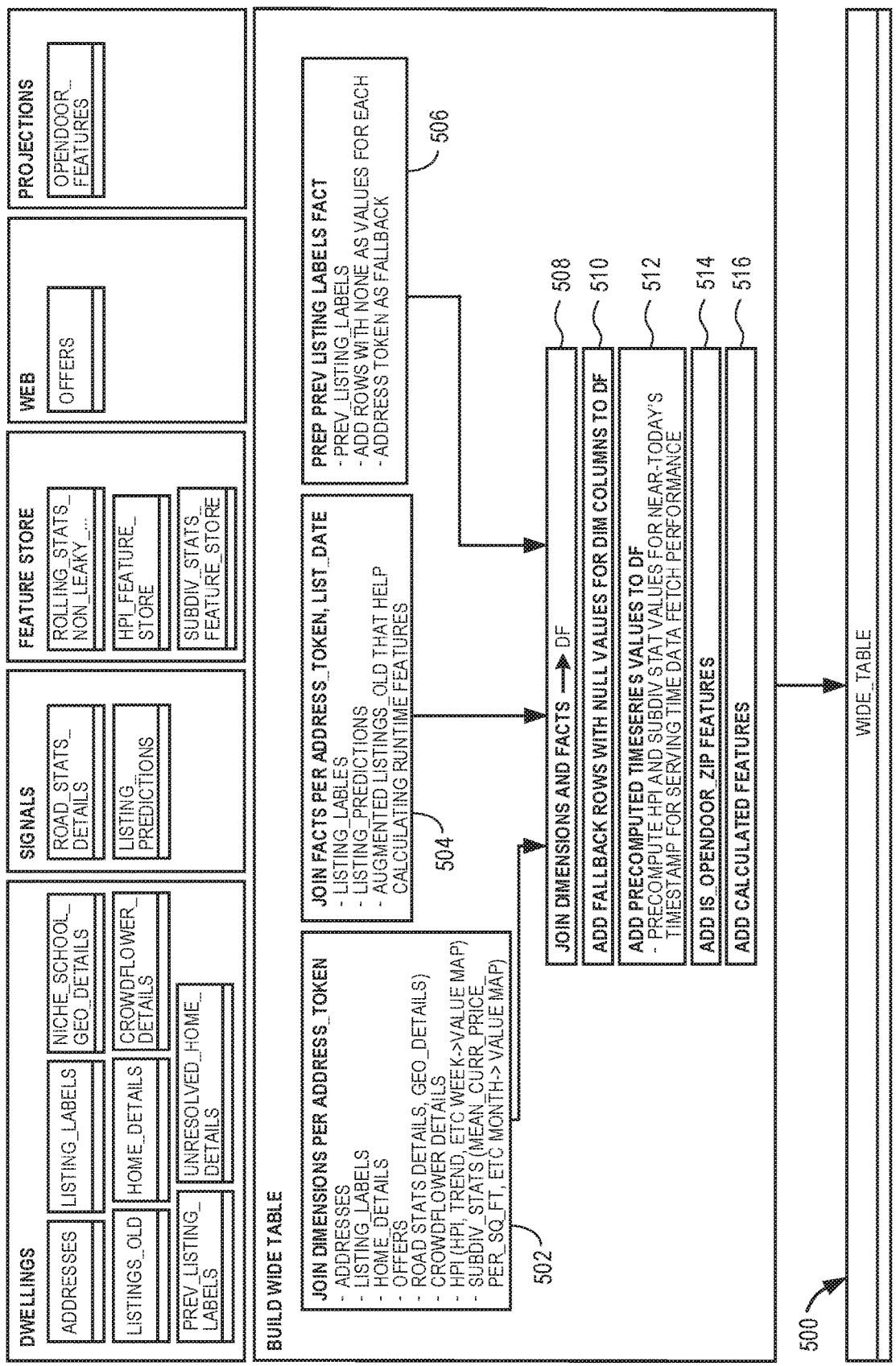
FIG. 5 is a diagram illustrating construction of a wide table, in accordance with an example embodiment.

FIG. 5 is a diagram illustrating construction of a wide table 500, in accordance with an example embodiment. Here, a join of dimensions per address token 502 is performed, resulting in a dimension table including addresses, housing labels, home details, offers, road status details including geographical details, details obtained from third-party services, house pricing information, and subdiv stats such as mean current price per square foot, etc.). A join of facts per address token and list date 504 is performed, resulting in a fact table including listing tables, listing predictions, and augmented listings that help in calculating runtime, such as listings including information obtained from MLS listings. The wide table stores features for each listing-status-change obtained from MLS and has a row for each of those changes. However, in some cases, there may be a house that has never been sold or listed for sale (or, at least, does not have any records of being sold or listed for sale with the MLS). A prepare previous listing tables fact 506 is performed, resulting in a table including previous listing labels and with rows added having none as values for each address token as fallback, ensuring that the wide table can never return an empty set for a home. At 508, the dimension and fact tables are joined to produce a df table. At 510, fallback rows with null values are added to the df table.

At 512, precomputed timeseries values are added to df. Here, HPI and subdiv stat values for current and near-current timestamps are precomputed for improvement of time data fetch performance.

At 514, an add_is opendoor_zip feature is added. This feature indicates that the listing is in a zipcode in which the system operates.

At 516, add calculated features is performed. The calculated features are any features that potentially depend on information that is not possessed by the system until a customer visits a corresponding web site. For example, while the system may have an estimate of home square footage, the seller may provide a more accurate estimate when requesting a price estimate from the system. Calculated features run at the time that a prediction of home value is made so they can included updated information provided during the year.

Thus, the wide table is used to collect all possible features about a home and listing. Essentially, every time a listing is updated, each such change has a new row in the wide table. The result, however, is a wide table that can be too big to process efficiently. In order to address this technical problem, a translation layer may be added to filter future leaks.

This translation layer returns the rows that best match a query but guarantee that such a row will not provide information from a later date than specified by the query.

It should be noted that the same mechanisms described above, including the feature stores and wide table, can be performed for all comparable properties as well as just the subject property. With comparables, however, it is difficult to precompute these values since there is no time yet specified in a query to guarantee against future leakage. For example, if one wanted to produce an estimate for a subject property based on comparables that occurred before the last time the subject property was sold (for example, 2012), it is difficult to precompute features for those comparables before that time is known (e.g., until the user specifies 2012 in the query, the system does not know to limit the data from comparables to 2012 or earlier). As such, in an example embodiment, features for all possible comparables for all times, based solely on distance from a subject property, for each possible subject property, can be precomputed. While this greatly improves performance at query-time, the result is more data than will fit on a single machine, and this type of computation is difficult to perform in a distributed fashion.

In an example embodiment, in order to reduce the size of the wide table, the feature store stores a set of features pivoted by (address token, list date) for comparables. Thus, subject-comp pairs can be precomputed per distance and stored in a comparables table. In one example embodiment, the comparable data is stored in an array in a wide table. In the wide table, each row of the table is pivoted per (address token, list date) and contains all of the features (hence, why it is called wide). Specifically, it may be a column in a wide table and data can be stored in the format of [(comp_address_token, distance)], where distance is the distance between the comparable and a subject property. Alternatively, it may be stored as a separate table in a flat fashion. Each comparable has a pair of address tokens and a distance. If auxiliary information is stored about comps, instead of a flat pair, the pair may be ordered as (subject_address-token, comp_address_token, comp_information). Alternatively, it may be stored in both a wide table and as a separate table. In some example embodiments, the system may filter to the appropriate set based on heuristics, as well as perform the scoring as part of the job hierarchy.

In an example embodiment, in order to improve training speed, the subj-comp pairs are precomputed per distance and stored in comps tables. Thus, at training time, all possible comps are precomputed for all potential subject homes. At runtime, all comps are also computed for the subject in question. This is because at training time it would be too expensive computationally to perform all the comp calculations at once for millions of listing simultaneously. At runtime, however, it is much cheaper computationally because there is only one subject properly being analyzed at a time, and it is also more convenient to do so dynamically as much less data needs to be stored.

In an example embodiment, only the address token and distance are stored. Pricing does not need to be included as the data is so time sensitive that oftentimes the pricing will be out of date when the model is actually training. A smaller pricing column can be used in the wide table in case pricing does become part of the table, but otherwise pricing may be maintained in a separate table.

Figure 6:
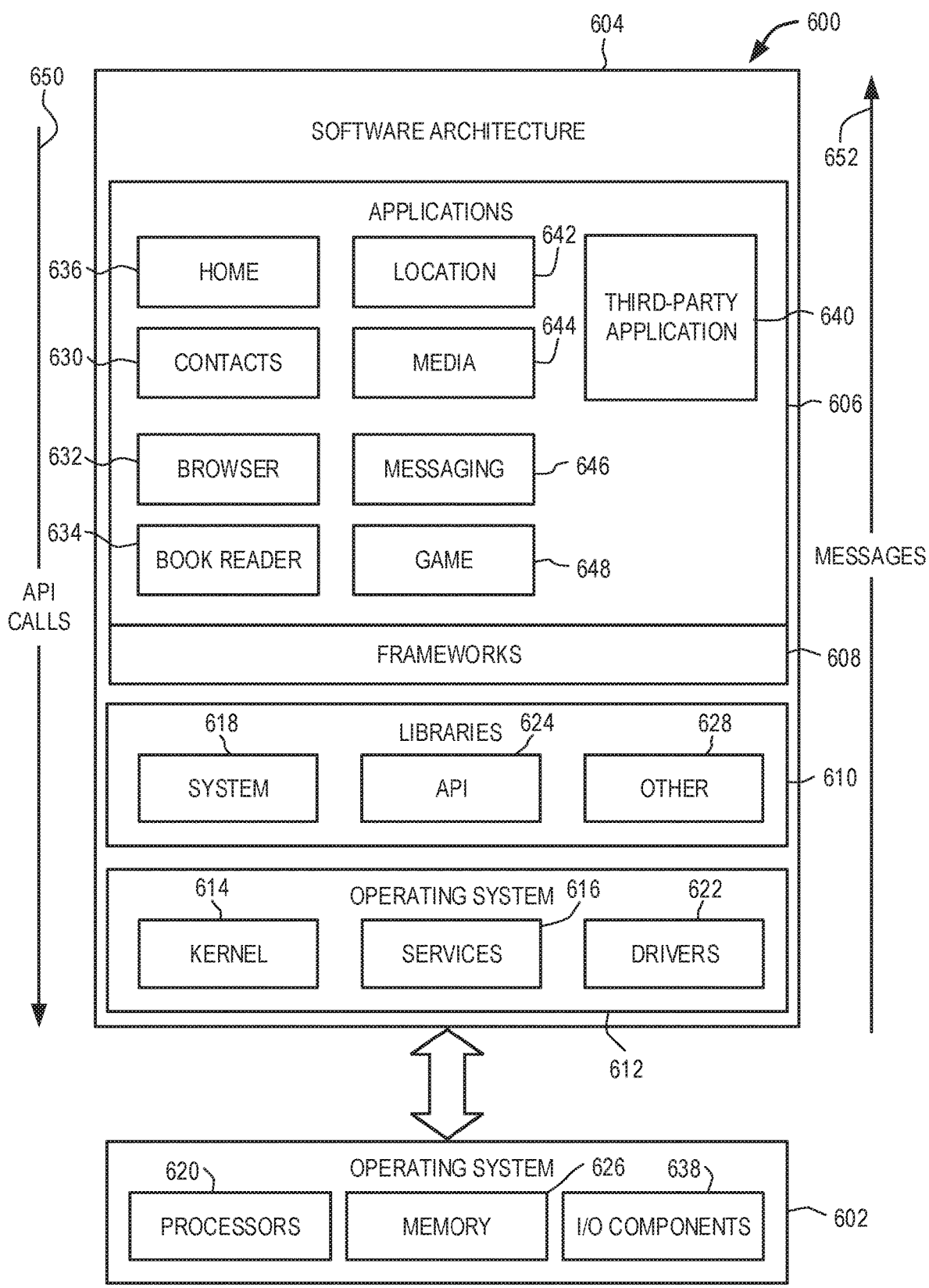
FIG. 6 is block diagram showing a software architecture within which the present disclosure may be implemented, according to an example embodiment.

FIG. 6 is a block diagram 600 illustrating a software architecture 604, which can be installed on any one or more of the devices described herein. The software architecture 604 is supported by hardware such as a machine 602 that includes processors 620, memory 626, and input/output (I/O) components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 640 can invoke the API calls 650 provided by the operating system 612 to facilitate functionality described herein.

Figure 7:
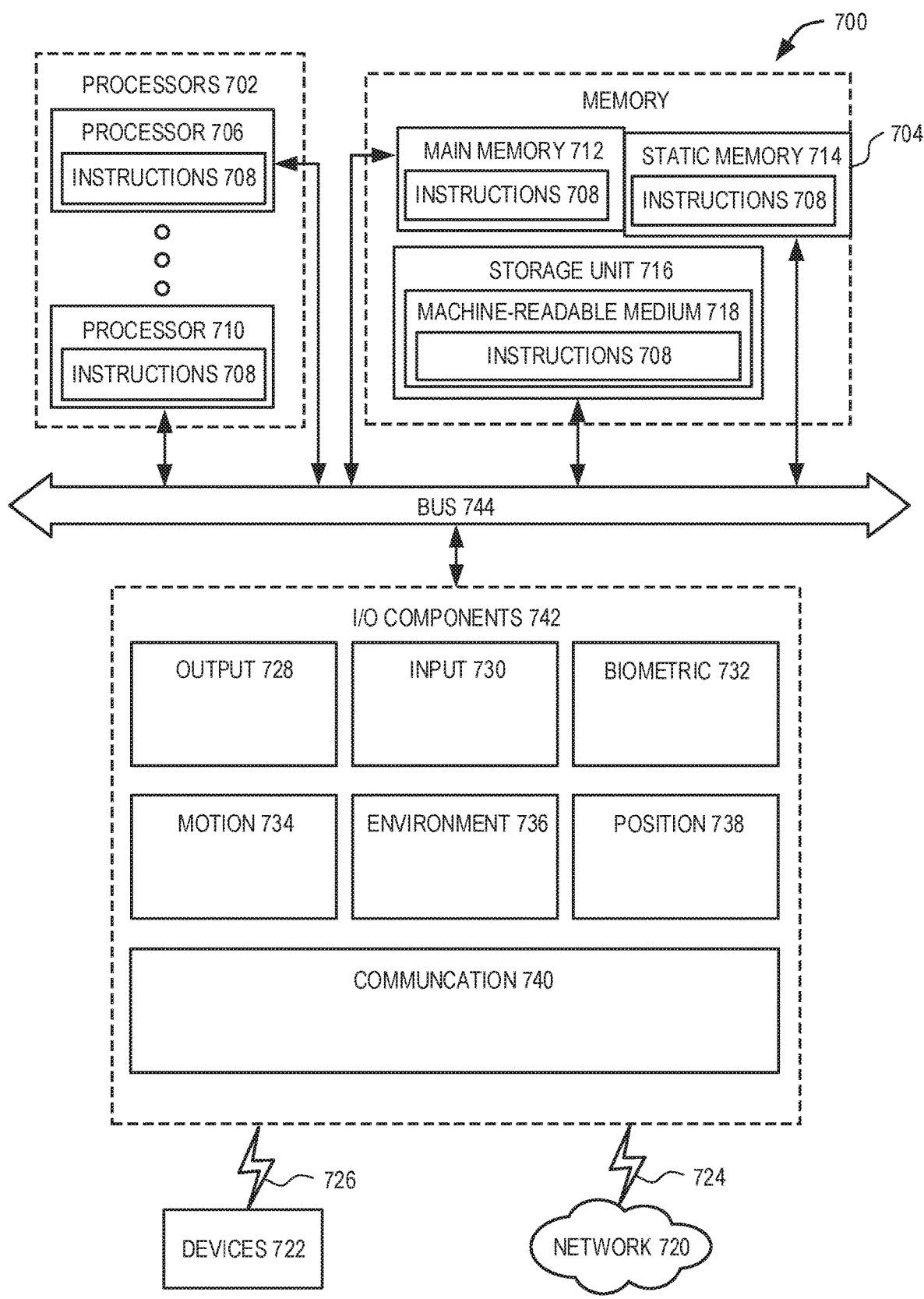
FIG. 7 is a diagrammatic representation of a machine in the form of a computer system within which a set of instructions may be executed for causing the machine to perform any one or more of the methodologies discussed herein, according to an example embodiment.

FIG. 7 is a diagrammatic representation of the machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a CPU, a RISC processor, a CISC processor, a GPU, a DSP, an ASIC, a RFIC, another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, all accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718, within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NEC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RIM)) tag reader components, NFC smart tag detection components, optical reader components (e.g., an optical sensor to detect one-dimensional bar codes such as Universal Product code (UPC) bar code, multi-dimensional bar codes such as Quick Response (QR) code, Aztec code, Data Matrix, Dataglyph, MaxiCode, PDF417, Ultra code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NEC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

The example embodiments described above may prove particularly useful for deploying code quickly, especially when developers require remote resources. It is also useful for developing APIs and hosting uncommitted prototypes.

What is claimed is:

1. A method to store time sensitive data in a database, the method comprising:
    obtaining time sensitive data;
    storing the time sensitive data in a wide table in the database; and
    defining a separate interface to each of two or more client applications, each of the two or more interfaces pointing to the time sensitive data in the wide table and including a feature layer, the feature layer defining joins between pieces of time sensitive data in the wide table, the defined joins including joins for data pertaining to one or more subject real-estate properties and joins for data pertaining to one or more comparable real-estate properties.

2. The method of claim 1, wherein at least one of the two or more client applications is a machine learning algorithm used to train a machine learned model on the time sensitive data and the corresponding feature layer in the corresponding interface defines the features used in the training.

3. The method of claim 1, wherein the time sensitive data includes comparables about real-estate properties.

4. The method of claim 3, wherein the comparables are stored in a column in the wide table.

5. The method of claim 3, wherein the comparables are stored in a flat table separate from the wide table.

6. The method of claim 1, wherein the wide table contains features precomputed for all possible comparables for all times, based solely on distance from a hypothetical subject property, for each possible hypothetical subject property.

7. The method of claim 6, wherein the features in the wide table are pivoted by (address token, list date).

8. An apparatus comprising:
    a processor; and
    a memory storing instructions that, when executed by the processor, configure the apparatus to perform operations comprising:
    obtaining time sensitive data;
    storing the time sensitive data in a wide table in a database; and
    defining a separate interface to each of two or more client applications, each of the two or more interfaces pointing to the time sensitive data in the wide table and including a feature layer, the feature layer defining joins between pieces of time sensitive data in the wide table, the defined joins including joins for data pertaining to one or more subject real-estate properties and joins for data pertaining to one or more comparable real-estate properties.

9. The apparatus of claim 8, wherein at least one of the two or more client applications is a machine learning algorithm used to train a machine learned model on the time sensitive data and the corresponding feature layer in the corresponding interface defines the features used in the training.

10. The apparatus of claim 8, wherein the time sensitive data includes comparables about real-estate properties.

11. The apparatus of claim 10, wherein the comparables are stored in a column in the wide table.

12. The apparatus of claim 10, wherein the comparables are stored in a flat table separate from the wide table.

13. The apparatus of claim 8, wherein the wide table contains features precomputed for all possible comparables for all times, based solely on distance from a hypothetical subject property, for each possible hypothetical subject property.

14. The apparatus of claim 13, wherein the features in the wide table are pivoted by (address token, list date).

15. A non-transitory computer-readable storage medium, the computer-readable storage medium including instructions that when executed by a computer, cause the computer to perform operations comprising:
obtaining time sensitive data;
storing the time sensitive data in a wide table in the database; and
defining a separate interface to each of two or more client applications, each of the two or more interfaces pointing to the time sensitive data in the wide table and including a feature layer, the feature layer defining joins between pieces of time sensitive data in the wide table, the defined joins including joins for data pertaining to one or more subject real-estate properties and joins for data pertaining to one or more comparable real-estate properties.

16. The non-transitory computer-readable storage medium of claim 15, wherein at least one of the two or more client applications is a machine learning algorithm used to train a machine learned model on the time sensitive data and the corresponding feature layer in the corresponding interface defines the features used in the training.

17. The non-transitory computer-readable storage medium of claim 15, wherein the time sensitive data includes comparables about real-estate properties.

18. The non-transitory computer-readable storage medium of claim 17, wherein the comparables are stored in a column in the wide table.

19. The non-transitory computer-readable storage medium of claim 17, wherein the comparables are stored in a flat table separate from the wide table.

20. The non-transitory computer-readable storage medium of claim 15, wherein the wide table contains features precomputed for all possible comparables for all times, based solely on distance from a hypothetical subject property, for each possible hypothetical subject property.

* * * * *